Nov. 6, 1934.  T. W. MUNFORD  1,980,077
RECUPERATOR
Filed Dec. 23, 1933  4 Sheets-Sheet 1

INVENTOR:
T. W. MUNFORD
BY
Charles A. Lind
ATTORNEY.

Nov. 6, 1934. T. W. MUNFORD 1,980,077
RECUPERATOR
Filed Dec. 23, 1933 4 Sheets-Sheet 2

INVENTOR:
T.W. MUNFORD
BY
Charles A. Lind
ATTORNEY.

Nov. 6, 1934.   T. W. MUNFORD   1,980,077
RECUPERATOR
Filed Dec. 23, 1933   4 Sheets-Sheet 3
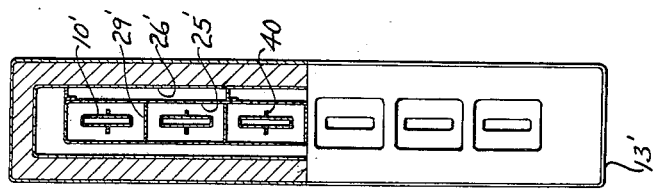
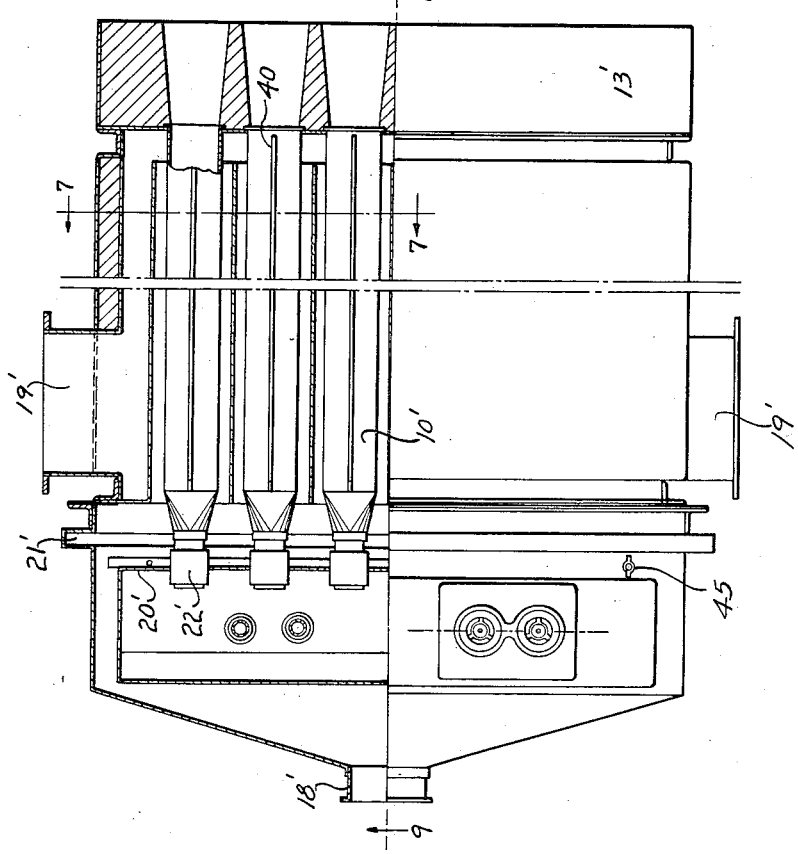
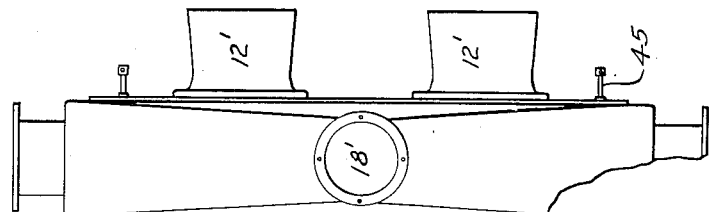
INVENTOR:
T. W. MUNFORD
BY
Charles A. Lind
ATTORNEY.

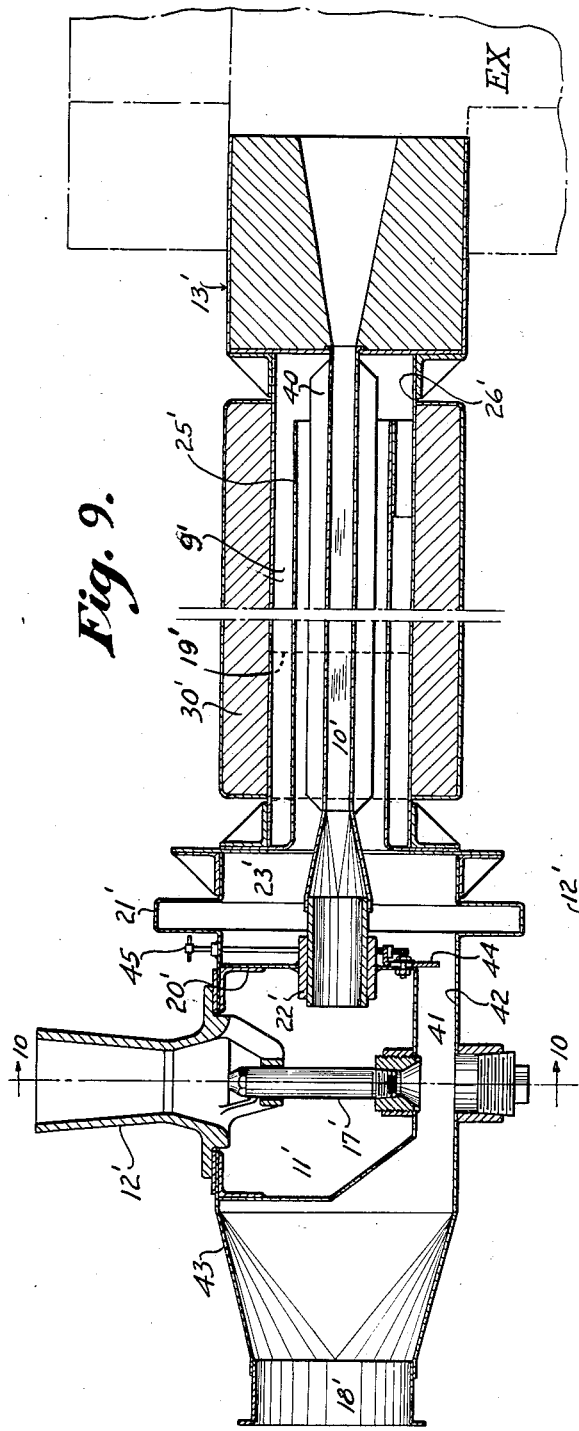
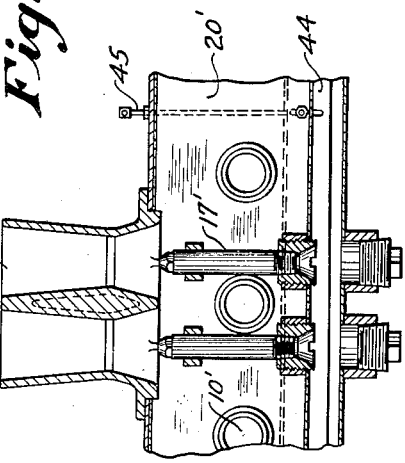

Patented Nov. 6, 1934

1,980,077

UNITED STATES PATENT OFFICE

1,980,077

RECUPERATOR

Theodore W. Munford, Toledo, Ohio, assignor to Surface Combustion Corporation, Toledo, Ohio, a corporation of New York Application December 23, 1933, Serial No. 703,761

11 Claims. (Cl. 257—237)

This invention relates to recuperators for industrial furnaces and has for an object to provide simple and practical means for inducing a flow of heating gases through the recuperator at a rate proportional to the flow of air therethrough to the end that variations in the temperature of the air due to changes in the rate of flow of the same through the recuperator may be reduced or practically eliminated.

The invention has special utility in connection with oil and gas fired forge furnaces operating above 1800° F. and requiring air preheated to approximately 500° F. for most efficient operation.

Referring to the drawings wherein the preferred form of the invention is shown,—

Fig. 6 is a half plan and half horizontal section of a modified form of recuperator on a greatly reduced scale as compared with Figs. 7 to 10, a portion of the structure being omitted as indicated by the space between the two parallel dot and dash lines;

Fig. 7 is a half end elevation and a half vertical section of the recuperator shown in Fig. 6, the half section being taken on line 7—7 of said Fig. 6;

Fig. 8 is an end elevation of the left hand end of Fig. 6;

Fig. 9 is a vertical section on line 9—9 of Fig. 6, a portion of the structure being omitted as indicated by the space between the two parallel dot and dash lines, the portion thus omitted being greater than in the case of Fig. 6 due to the difference in scale of the two views, a portion of the exhaust flue from a furnace also being shown in dotted lines, and Fig. 10 is a transverse vertical section on line 10—10 of Fig. 9.

Figure 1:
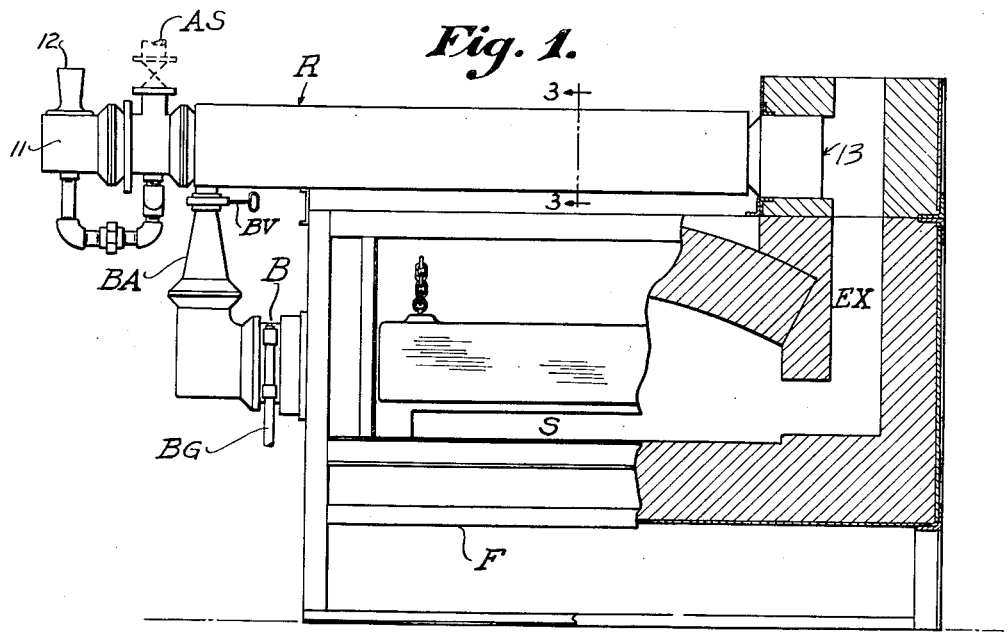
Fig. 1 shows the improved recuperator in side elevation and how the same is applied or combined with a more or less conventional type of slot type forge furnace, parts of the latter being in section to show its exhaust flue, the view as a whole being on a greatly reduced scale as compared with Figs. 2 to 5.
Figures 2, 3:
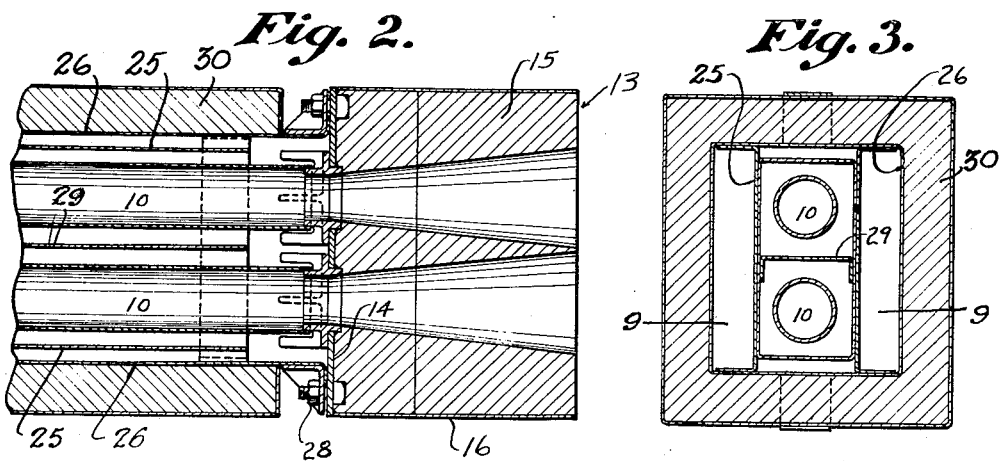
Fig. 2 is a vertical section of the flue gas intake end of the recuperator shown in Fig. 1.
Fig. 3 is a transverse section on line 3—3 of Fig. 1.
Figure 4:
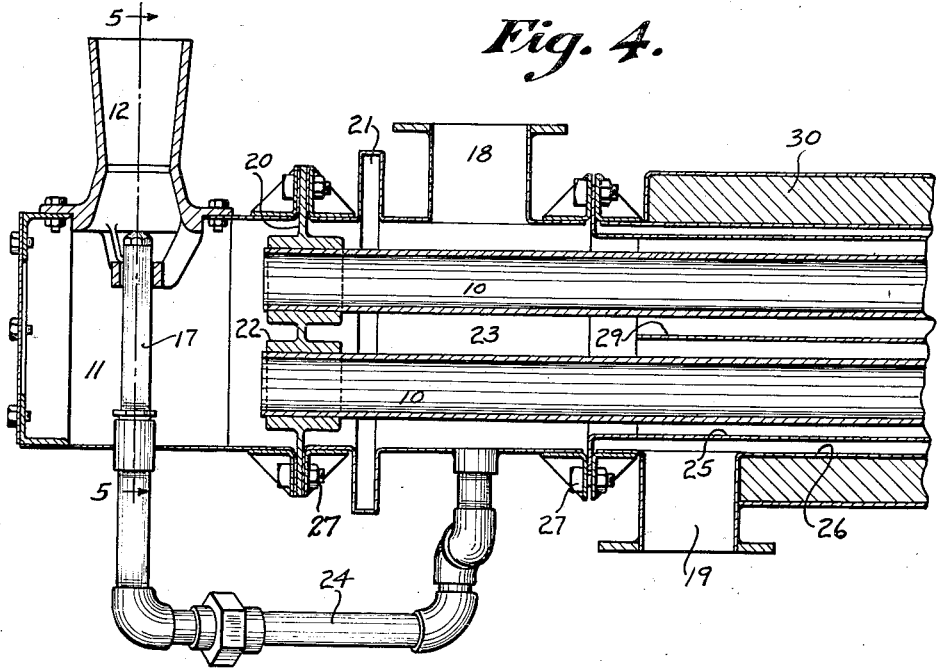
Fig. 4 is a vertical longitudinal section of the left hand portion of recuperator as viewed in Fig. 1.
Figure 5:
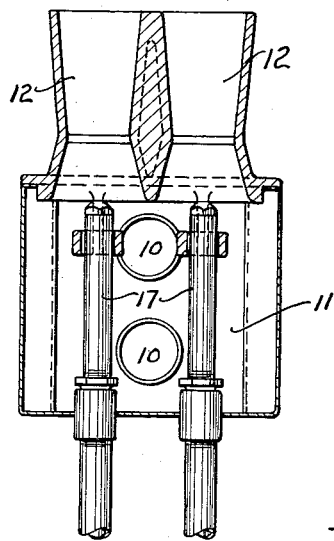
Fig. 5 is a transverse vertical section on line 5—5 of Fig. 4.

In Fig. 1, F indicates a steel heating furnace of the type having a side opening or slot S for the entry and removal of the objects to be heated. The furnace is shown as fired by a burner B and as having an upright exhaust flue EX which at its upper end is open to the atmosphere. The burner B may be either an oil or gas burner but for the purposes of this description, it will be assumed that it is a gas burner. The fuel supply for the burner is indicated at BG and the air supply conduit at BA.

The recuperator which forms the subject of the present invention is constructed and arranged to withdraw flue gases from the exhaust flue EX for the purpose of preheating the air supply to the burner B. The recuperator as a whole is generally indicated at R and is disposed above the furnace with one end in direct communication with the flue EX and the other end in direct communication with the burner air conduit BA which latter is preferably provided with a gate valve BV. The air to be preheated is delivered to the recuperator by a supply conduit indicated in dotted lines at AS and which leads from a fan or blower not shown for supplying the air under pressure.

Referring now more particularly to Figs. 2 to 5, 10 indicates a flue tube one end of which is in open communication with the exhaust flue EX and the other end of which is in direct communication with an exhaust box 11 having a chimney or exhaust conduit 12. The number of flue tubes employed depends on the desired capacity of the recuperator; and in the present instance two such tubes are shown, one above the other.

Associated with the inlet end of the tubes 10 and forming in effect an extension thereof is a flue gas inlet head generally indicated at 13. This head comprises an apertured tube-supporting plate 14 and an apertured refractory block 15 which is held in position against the plate by a metal jacket 16. The apertures in the block are of funnel type and are in direct communication with the exhaust flue EX.

Housed by the exhaust box 11 is a jet orifice nozzle 17 set to discharge upwardly into the chimney 12 whereby to produce a partial vacuum in the box in order to induce the flue gases in the furnace flue EX to enter the tubes 10 for flow therethrough for final discharge through the chimney 12. Hence, it will be seen that the chimney and nozzle together constitute an aspirator for drawing the flue gases through the tubes from the said flue EX. Rather than employ a single aspirator of large capacity, it is preferred to employ a number of aspirators of smaller capacity; hence in the present instance two nozzles are shown associated with individual passages in the chimney. The said passages are preferably of Venturi type as shown.

The tubes 10 extend through an air casing, the inlet of which is indicated at 18 and the outlet at 19. The said tube-supporting plate 14 constitutes one closure for the casing and the tube-supporting wall 20 of the exhaust box constitutes the other. 21 indicates a flexible expansion joint in the casing. Expansion of the tubes is also taken care of by slidably supporting them in sleeve bearings 22 in the end wall 20. The inlet section 23 of the air casing is in connection with the aspirator nozzles 17 by pipes 24; hence some of the air supplied to the recuperator is discharged from said nozzles.

That portion of the casing between its inlet and outlet comprises an inner shell 25 and an outer shell 26 both secured at one end to the adjacent end of section 23 as by bolts 27. At its other end, the outer shell 26 is appropriately secured to the tube-supporting plate 14 as by bolts 28 whereas the inner shell terminates short of said plate, it being noted that the flue tubes 10 are inside of the inner casing. Hence, air from the inlet 18 flows first through the shell 25 toward the flue-gas inlet end of the tubes 10 and in direct contact with the latter and then back through the passages 9 formed between the two shells to the outlet 19. It is preferred that the inner shell be horizontally divided between the flue tubes by a partition wall 29 to divide the shell into two separate air passages or conduits, one for each flue tube. The outer shell 26 is surrounded by an insulating jacket 30.

In accordance with the present invention, a suction effect is produced in the exhaust box 11 by the air discharged from the nozzles 17; hence the amount of flue gases drawn through the flue tubes is proportional to the pressure of the air delivered to the recuperator. Hence, the flow of flue gases through the recuperator is proportional to the amount of air passing therethrough. This feature automatically results in an almost constant preheat and provides against overheating and burning out of the recuperator.

Reference is now made more particularly to the form of the invention shown in Figs. 6 to 10. In this case, the recuperator is much wider than in the other case and each flue 10′ is oblong in cross section from the inlet head 13′ to a point adjacent the wall 20′ of the exhaust box 11′ where it is brought to a circular form and slidably supported in a sleeve bearing 22′ in the said box wall. The flue tube 10′ as in the other form of the invention extends through an air casing comprising inner and outer shells 25′ and 26′, respectively, and the tubes in the inner shell are separated from each other by partition walls 29′ (Fig. 7). The tubes are also shown as provided with outer longitudinally extending stiffening ribs 40. The outer shell is provided with an insulating jacket 30′. 21′ indicates an expansion joint in the recuperator casing.

The inlet for the air to be preheated is indicated at 18′ and there are two oppositely-disposed lateral outlets 19′. The inlet is in communication with a distributing chamber 23′ by way of a passage 41 formed between the outer wall of the exhaust box 11′ and the lower wall 42 of the air casing 43 wherein the said box is in effect housed. In some cases, it may be desirable to restrict the flow of air into the chamber 23′ and to this end there is provided a gate valve 44 arranged to be vertically adjusted by screw rods 45.

The air supplied to the chamber 23′ flows through the inner casing 25′ toward the flue-gas intake end of the flue tubes 10′ and then back through the passages 9′ formed between the two outer casings to the lateral air outlets 19′.

The two outlets 19′ may deliver to one or more burners. As in the other form of the invention, the air will be supplied to the recuperator under appropriate pressure, and some of the air will flow to the nozzles 17′ for producing a partial vacuum or suction effect in the exhaust box to induce the gases in the furnace flue EX to enter and flow through the flue tubes 10′.

The amount of air required to be diverted to the aspirator nozzles is but a small part of the total volume supplied to the recuperator and ordinarily will not be in excess of 7 to 10% of the total volume.

Having thus described the invention what I claim and desire to secure by Letters Patent is:

1. In apparatus for utilizing hot gases of combustion from a furnace for preheating air for combustion, the combination of a flue tube, a casing through which the supply of air to be heated flows and the tube extends, said tube being open at one end to the inflow of said gases, and means associated with the other end of the tube for drawing said gases through the tube at a rate proportional to the flow of the air through the casing.

2. In apparatus for utilizing hot gases of combustion from a furnace for preheating air for combustion, the combination of a flue tube, a casing through which the supply of air to be heated flows and the tube extends, said tube being open at one end to the inflow of said gases, and an aspirator associated with the other end of the tube for drawing said gases through the tube.

3. In apparatus for utilizing hot gases of combustion from a furnace for preheating air for combustion, the combination of a flue tube, a casing through which the supply of air to be heated flows and the tube extends, said tube being open at one end to the inflow of said gases, an aspirator associated with the other end of the tube for drawing said gases through the tube, and means for diverting air from the said supply to the aspirator for operating the latter.

4. In apparatus for utilizing hot gases of combustion from a furnace for preheating air for combustion, the combination of a flue tube, a casing through which the supply of air to be heated flows and the tube extends, said tube being open at one end to the inflow of said gases, an exhaust box at the other end of the tube, a conduit forming an outlet from the box, and means associated with the conduit for producing a partial vacuum in the box whereby to induce the said gases to enter the said tube.

5. In apparatus for utilizing hot gases of combustion from a furnace for preheating air for combustion, the combination of an exhaust box, means comprising a conduit forming an outlet from said box, means housed by the box and coacting with the said conduit to produce a partial vacuum in the box, a tube open to said gases and in direct communication with said box whereby said gases are induced to flow into said tube, and an air casing through which the tube extends.

6. In apparatus for utilizing hot gases of combustion from a furnace for preheating air for combustion, the combination of an exhaust box, means comprising a conduit forming an outlet from said box, means housed by the box and coacting with the said conduit to produce a partial vacuum in the box, a tube open to said gases in direct communication with said box whereby said gases are induced to flow into said tube, an air casing through which the tube extends, and a walled structure cooperating with the exterior of said box to form a passage for the inflow of air to the casing.

7. In apparatus for utilizing hot gases of combustion from a furnace for preheating air for combustion, the combination of an exhaust box, means comprising a conduit forming an outlet from said box, a nozzle associated with the said conduit to produce a partial vacuum in the box, a tube open to the said gases and in direct communication with said box whereby said gases are induced to flow into said tube, an air casing through which the tube extends, and means outside of said box for delivering air to said nozzle.

8. In apparatus of the class described, the combination of an exhaust box, a plurality of conduits extending from the box and forming outlets therefrom, nozzles individual to said conduits and set to discharge thereinto in a manner to produce a partial vacuum in the box, a plurality of flue tubes extending from the box and open at their far ends to the entry of hot gases, and an air casing through which the tubes extend.

9. In apparatus of the class described, the combination of an exhaust box, a plurality of conduits extending from the box and forming outlets therefrom, nozzles individual to said conduits and set to discharge thereinto in a manner to produce a partial vacuum in the box, a plurality of flue tubes extending from the box and open at their far ends to the entry of hot gases, an air casing through which the tubes extend for heating air flowing therethrough, and a walled structure cooperating with the exterior of said box to form a passage for the inflow of air to the casing.

10. In apparatus of the class described, the combination of an exhaust box, a plurality of conduits extending from the box and forming outlets therefrom, nozzles individual to said conduits and set to discharge thereinto in a manner to produce a partial vacuum in the box, a plurality of flue tubes extending from the box and open at their far ends to the entry of hot gases, an air casing through which the tubes extend for heating air flowing therethrough, and means outside of the box for delivering air under pressure to the nozzles.

11. The combination with a recuperator, of means for supplying air under pressure to the recuperator, and means for utilizing some of said air for inducing the heating gases to flow through the recuperator.

THEODORE W. MUNFORD.